United States Patent [19]
Fantozzi et al.

[11] Patent Number: 4,989,928
[45] Date of Patent: Feb. 5, 1991

[54] COMPACT INFRARED LENS ARRANGEMENT INCLUDING AT LEAST THREE REFLECTIONS

[76] Inventors: Louis R. Fantozzi, 4 Gordon Ave., Pelham, N.H. 03051; Lawrence Kessler, 173 8th St., Bethpage, N.Y. 11714; Richard Draxler, 59 E. Neck Ct., West Babylon, N.Y. 11704

[21] Appl. No.: 455,774

[22] Filed: Dec. 28, 1989

Related U.S. Application Data

[63] Continuation of Ser. No. 300,170, Jan. 19, 1989, abandoned, which is a continuation of Ser. No. 181,724, Apr. 14, 1988, abandoned, which is a continuation of Ser. No. 924,625, Oct. 29, 1986, abandoned.

[51] Int. Cl.$^5$ .................... G02B 23/02; G02B 13/14
[52] U.S. Cl. ........................... 350/1.3; 350/1.2; 350/569; 350/622
[58] Field of Search ..................... 350/1.2–1.4, 350/415, 569, 622

[56] References Cited
U.S. PATENT DOCUMENTS

| | | | |
|---|---|---|---|
| 754,076 | 3/1904 | König | 350/569 |
| 4,383,727 | 3/1983 | Rogers | 350/1.3 |
| 4,695,119 | 9/1987 | Neil | 350/1.3 X |
| 4,798,450 | 1/1989 | Suzuki | 350/622 |

*Primary Examiner*—Bruce Y. Arnold
*Assistant Examiner*—Martin Lerner
*Attorney, Agent, or Firm*—Ostrolenk, Faber, Gerb & Soffen

[57] ABSTRACT

The invention relates to an infrared optical system which is capable of providing an effective focal length of about 240 mm, but fitting into a spherical package whose diameter is approximately 150 mm. To achieve such a degree of compactness, the invention employs an optical path including three reflections, which in combination define a question-mark-shaped optical path. Between the first and second reflections, the transmitted beam is passed through a focal plane and then is recollimated, and the collimated beam is then passed through the succeeding two reflections, after which it is directed telecentrically onto a detector. The invention further relates to a specific combination of lenses.

18 Claims, 2 Drawing Sheets

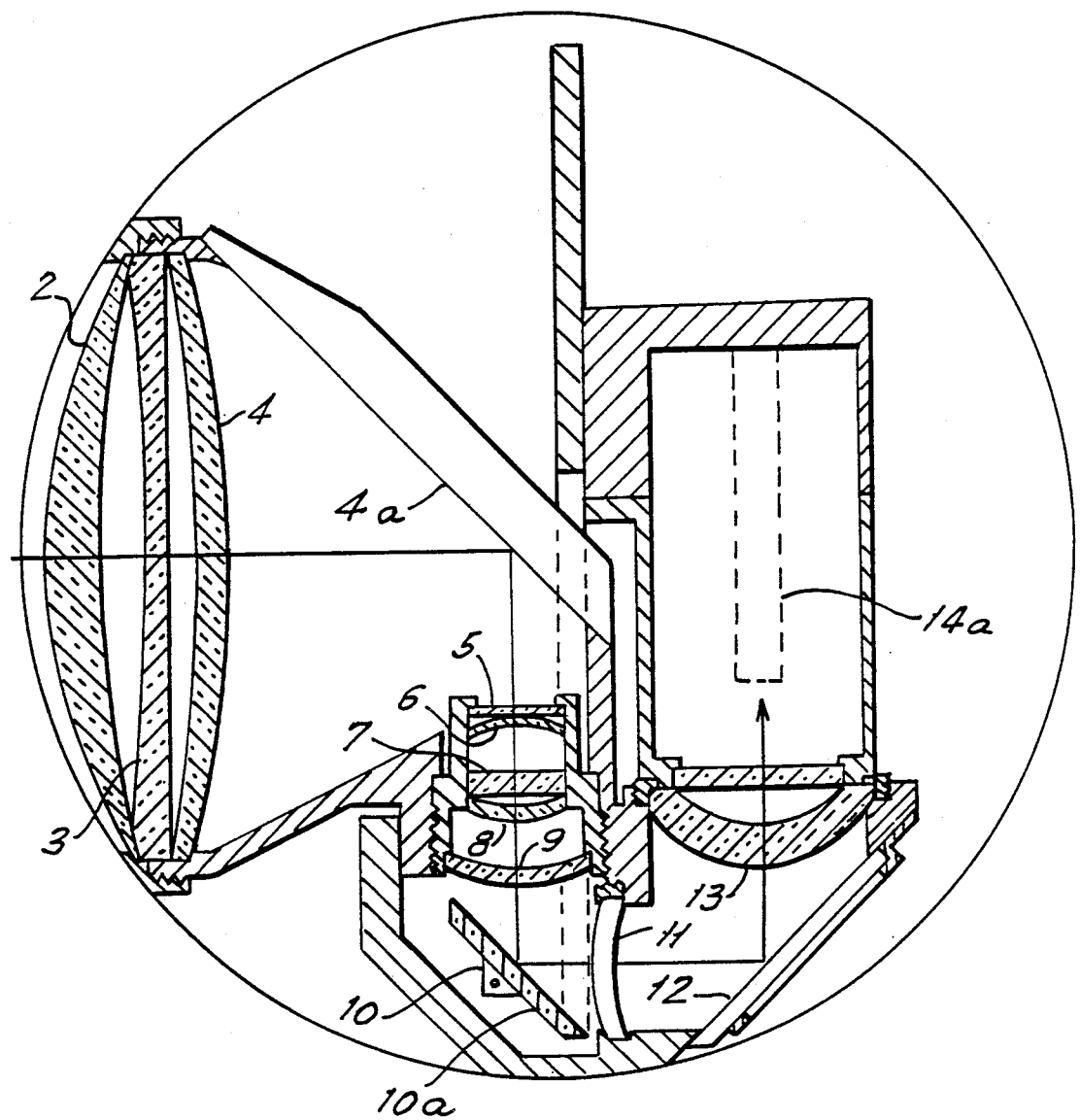
FIG._2_

4,989,928

COMPACT INFRARED LENS ARRANGEMENT INCLUDING AT LEAST THREE REFLECTIONS

This is a continuation of application Ser. No. 07/300,170, filed on Jan. 19, 1989, now abandoned by Louis R. Fantozzi et al. entitled "LENS ARRANGEMENT", which is a Continuation of Ser. No. 07/181,724, filed on Apr. 14, 1988, by Louis R. Fantozzi et al. entitled "LENS ARRANGEMENT", now abandoned, which is a Continuation of Ser. No. 924,625, filed on Oct. 29, 1986, by Louis R. Fantozzi et al. entitled "LENS ARRANGEMENT", now abandoned.

BACKGROUND OF THE INVENTION

The invention relates to an optical system, and more particularly to an infrared lens arrangement having a high degree of compactness through employing at least three reflections, two of which are reflections of a collimated beam.

Infrared lens arrangements and detectors are known, but an unsatisfied need has been to provide a miniature, flyable sensor head for either target detection or target imaging in the infrared spectral region. Such a system must have great focal length and magnification and yet be fully contained in a small and compact package.

SUMMARY OF THE INVENTION

Accordingly, a central object of the invention is to avoid the packaging constraints that have made it difficult to provide a sensor head (that is, detector package plus lens system) for target detection or imaging in the infrared spectral region, in a small package which can be mounted on an aircraft.

This object is achieved according to preferred embodiments of the invention, in an infrared optical system that may have an effective focal length of about 240 mm, but fit into a spherical package approximately 150 mm in diameter. To achieve such extraordinary compactness, the invention may employ an optical path including three reflections, which in combination define a question-mark-shaped optical path. Between the first and second reflections, the transmitted beam may be passed through a focal plane and then recollimated, and the collimated beam may then be passed through the succeeding two reflections, after which it is directed onto a detector. Advantageously, the embodiments of the invention may employ a specific combination of lenses.

The invention can provide a telecentric image plane, which is highly advantageous. In a telecentric arrangement, the chief ray hits the image plane perpendicularly. For off-axis rays, assuming the center ray hits the image plane at an angle $\theta$, a light loss occurs which is proportional to cos $\theta$. Thus, in a telecentric system the cosine light loss is reduced.

The system is designed to operate in about the 3-5 micron spectral region. It is incorporated in a protective dome, and can produce a flat-field, high-resolution, low-distortion image. In one embodiment of the invention, the system employs a stationary turn mirror which also serves as the stop of the system. Alternatively, the arrangement may be employed with a point detector, and may have an internal scanning mirror in the collimated beam space.

The system also reduces the effect of stray light, and includes a stop for providing f-number-limited collection of light at the detector plane.

According to an aspect of the invention, a lens arrangement comprises a plurality of optical elements, for receiving input radiation and providing an optical path including at least three reflections, and an internal focal plane between the first and second reflections. Advantageously, the arrangement is substantially telecentric for infrared radiation. A length of an optical path for infrared radiation of at least 240 nm is obtained, the lens arrangement being fully contained in a spherical region no more than about 150 mm in diameter.

BRIEF DESCRIPTION OF THE DRAWINGS

Other objects, features and advantages of the invention will be seen in the following detailed description of preferred embodiments thereof, with reference to the drawings, in which:

FIG. 2 is a cross-sectional view of a practical example of a lens arrangement according to a second preferred embodiment of the invention.

DETAILED DESCRIPTION OF THE PREFERRED EMBODIMENTS

Figure 1:
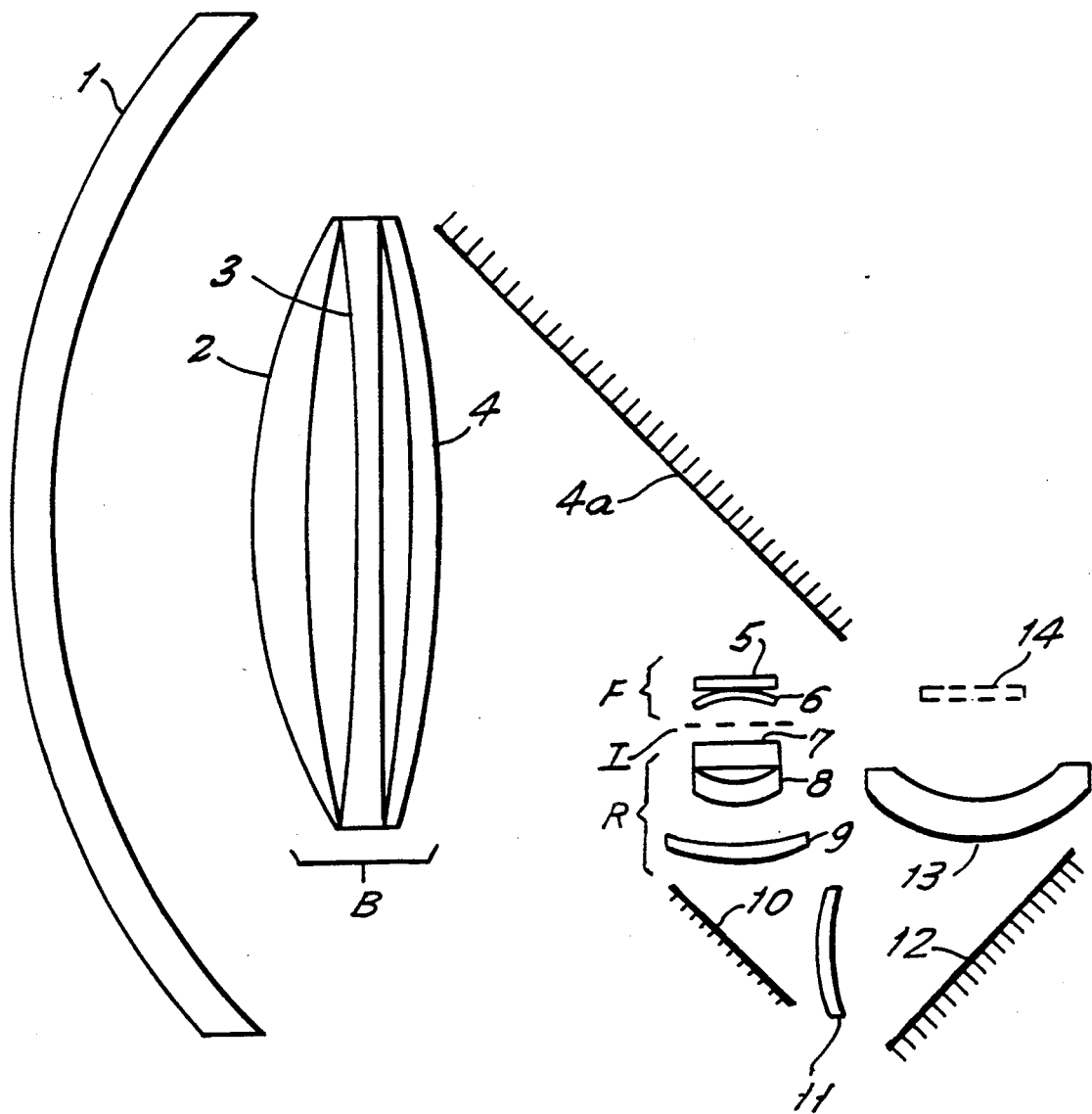
FIG. 1 shows in schematic form the components of a lens arrangement according to a first preferred embodiment of the invention.

Referring to FIG. 1, there is seen in schematic form a lens arrangement according to a first embodiment of the invention.

Specific constructional details of the system are shown in Table 1. Table 1 lists the power, material, inner and outer radii, thickness and type of each optical component, and also the thicknesses of the air gaps between the components. Specifically with respect to element 13, the base radii shown in Table 1 are modified to provide a highly aspheric surface, as set forth in Table 2.

The overall specifications for this embodiment are as follows. The effective focal length of the system is 240 mm. The field of view is ±2 degrees, and the effective f-number of the system is f/2.86. The wavelength range of the system is 3.4-5 microns.

All the optical components advantageously have a low f-number, less than about f/1.2.

Very high image quality is obtained by the embodiment. The geometrically determined modulation transfer function (MTF) at 14 line pairs/mm is over 90% on axis. The full field of view is ±2 degrees, and of this the 1.0 field is greater than 70% sagittal/85% tangential. The 0.7 field (1.4°) is greater than 80% sagittal/80% tangential. Distortion is less than 1% and telecentricity is less than 1°.

As seen in FIG. 1, the arrangement comprises a multi-element, 6.5× infrared Keplerian telescope formed by elements 1–9, including lenses of crystalline semiconductor material, and reflective components. It is a Keplerian telescope in that it forms a real internal image, that is, between elements 6 and 7. Elements 7–9 are effectively the eyepiece of the Keplerian telescope.

Both the input and the output of elements 1–9 is collimated light. Radiation enters a protective silicon dome 1 and passes through elements 2–6, producing a real image at an internal focal plane I.

After passig through the silicon dome 1, the beam passes through a first objective lens group B comprising elements 2, 3 and 4. This group is preferably achromatized for the 3.4-5 micron spectral range and also compensates for aberrations produced by the protective dome 1. The first objective lens group B has a P-N-P construction and a long back working distance. That is, the distance from the back vertex of element 4 to the focal plane is at least close to the effective focal length of lens group B.

After passing through the first objective lens group B, the radiation is reflected 90 degrees by a stationary turn mirror (the first mirror) 4a. This is the first of three reflections which achieve a high degree of compactness for the system. The use of such a turn mirror is enabled by the long back working distance of the first objective lens group.

The radiation then passes through a lens group F comprising elements 5 and 6, which flattens the field, and the radiation forms an internal image at the plane I following the lens element 6. Stray light baffling (not shown) is advantageously performed in this area. At the focal plane I, the image is reduced by 2.8 times with respect to its size at the detector plane, which permits effective baffling to eliminate stray light entry into the detector.

Subsequently, eyepiece group R comprising elements 7–9 recollimates the focused light over a ±13 degree field. The eyepiece group 7–9 operates with an f-number of 1.02.

The collimated space angle between lenses 9, 10 and 11 is ±13 degrees, while the objective space angle at dome 1 is ±2 degrees. That is, the field of view is ±13 degrees. The radiation exiting element 9 is telecentric to within one degree, which reduces cosine losses throughout the field.

The radiation is then directed toward another stationary turn mirror 10 (the second mirror), and is reflected 90 degrees toward the objective lens group 11–13. Although in FIG. 1 the mirror 10 is shown as a stationary mirror, as discussed below it can be replaced by an active scan mirror. The mirror 10 provides a second reflection for further compacting the assembly. Also, the mirror 10 serves as a stop. Thus, it provides a limit for the detector collection angle and determines the f-number of the lens arrangement.

The importance of the stop provided by the edges of the mirror 10 lies in that the quantity of light arriving at the lens 13 should be limited to provide a constant f-number over the entire field of view. In the case where the detector 14 is a two-dimensional array or a linear array, wherein each individual cell is identical, it is preferable for proper detection for each individual cell to have the same effective f-number at that position.

Elements 11–13 form the main objective lens of the lens assembly of the invention. The radiation passes through a third lens group comprising elements 11, 12 and 13, which refocuses the light onto a detector focal plane or detector 14 over about an 18 mm image format and produces an overall magnification of 6.5×. Element 12 is a reflective component, namely a stationary turn mirror providing a third reflection for further improving the compactness of the assembly. Element 13 is a highly aspheric component.

Lens group 11–13 has an effective focal length of 36.738 mm. It has an effective f-number of f/2.86. Its field of view is ±13 degrees.

As discussed above, in FIG. 1 the element 10 is a stationary turn mirror. FIG. 2 shows a second embodiment of the invention, in which an element 10a, which corresponds to the element 10 in FIG. 1, is instead a scan mirror. In this embodiment, a scene is created by scanning the scan mirror 10a so as to create the scene at a point detector 14a. This is distinguished from the embodiment of FIG. 1, in that in FIG. 1 the turn mirror 10 is stationary and the detector 14 is a linear or two-dimensional detector array. In other respects FIG. 2 illustrates features similar to the features in FIG. 1.

A description of an infrared detector array 14 contemplated to be employed in the embodiment of FIG. 1 is as follows. The detector array has a size of about 18 mm or smaller, with pixel sizes as small as 0.038 mm. Light to be provided to the detector array is collimated by the detector lens group, collimated light being reflected by the second mirror 10. Since this mirror is the stop of the system, the f-number light collection of each individual pixel in the detector array is limited thereby, which is an effective means of reducing background radiation.

Although illustrative embodiments of the invention have been described herein, it is to be understood that the invention is not limited to such embodiments, but rather that modifications and variations may occur to one skilled in the art within the spirit and scope of the invention, as defined by the claims.

TABLE 1

| Element | Power | Material | Outer radius, mm | Inner radius, mm | Thickness, mm | Type |
|---|---|---|---|---|---|---|
| 1 | O | Si | 114.300 | 107.950 | 6.35 | Dome |
| A1-2 | | | | | 29.00 | Air gap |
| 2 | P | Si | 89.024 | 182.842 | 7.9 | Spherical |
| A2-3 | | | | | 7.9 | Air gap |
| 3 | N | Ge | −358.712 | +3820.792 | 3.388 | Spherical |
| A3-4 | | | | | 4.143 | Air gap |
| 4 | P | Si | −261.808 | −165.749 | 4.353 | Spherical |
| A4-4a | | | | | 40 | Air gap |
| 4a | O | Pyrex | | | | Stationary Turn Mirror |
| A4a-5 | | | | | 26.706 | Air gap |
| 5 | N | Si | −468.512 | +1296.288 | 1.145 | Spherical |
| A5-6 | | | | | 0.0458 | Air gap |
| 6 | N | Ge | 13.215 | 12.905 | 1.182 | Spherical |
| A6-I | | | | | 3.476 | Air gap |
| I | | | | | | Image |
| AI-7 | | | | | 3.200 | Air gap |
| 7 | N | Ge | 104.854 | 83.979 | 3.903 | Spherical |
| A7-8 | | | | | 1.428 | Air gap |
| 8 | P | Si | −15.807 | −14.979 | 3.136 | Spherical |
| A8-9 | | | | | 6.100 | Air gap |
| 9 | P | Si | −37.319 | −21.473 | 3.187 | Spherical |
| A9-10/10a | | | | | 12.5 | Air gap |

TABLE 1-continued

| Element | Power | Material | Outer radius, mm | Inner radius, mm | Thickness, mm | Type |
|---|---|---|---|---|---|---|
| 10/10a | O | | | | | Turn mirror (Stationary/Scan) |
| A10/10a-11 | | | | | 12.5 | Air gap |
| 11 | P | Si | 68.614 | 83.507 | 3.040 | Spherical |
| A11-12 | | | | | 21.800 | Air gap |
| 12 | O | | | | | Stationary Turn mirror |
| A12-13 | | | | | 15.062 | Air gap |
| 13 | N | Si | 19.490* | 18.863** | 6.451 | Aspheric |
| A13-14 | | | | | 19.000 | Air gap |
| 14 | | | | | | Image |

*Aspheric surface - see Table 2 for modifications to base radius.
**Spherical curve

TABLE 2

| Aspheric Surface of Element 13 | | | |
|---|---|---|---|
| CC | $-1.44 \times 10^{-1}$ | AF | $-5.033 \times 10^{-11}$ |
| AD | $-2.78 \times 10^{-6}$ | AG | $8.101 \times 10^{-14}$ |
| AE | $1.335 \times 10^{-8}$ | | |

What is claimed is:

1. A lens arrangement comprising:
   a plurality of optical elements, for receiving input radiation and providing an optical path for said input radiation,
   said optical path including at least three reflections, and an internal focal plane between the first and second reflections,
   wherein the length of the optical path for input radiation in the infrared range is at least about 240 mm, the lens arrangement being fully contained in a spherical region no more than about 150 mm in diameter.

2. A lens arrangement as in claim 1, wherein said optical path has the form of a question mark.

3. A lens arrangement as in claim 2, wherein said optical elements recollimate said radiation following said internal focal plane.

4. A lens arrangement as in claim 3, said second and third reflections being of said recollimated radiation.

5. A lens arrangement as in claim 4, wherein said arrangement is substantially telecentric for infrared radiation.

6. A lens arrangement as in claim 1, wherein said arrangement is substantially telecentric for infrared radiation.

7. A lens arrangement as in claim 6, wherein said optical elements include both refracting elements and reflecting elements, and said three reflections occur outside of said refracting elements.

8. A lens arrangement as in claim 1, said arrangement comprising, in sequence:
   (a) an input window for receiving such radiation;
   (b) a first objective lens group;
   (c) a first turn mirror which is stationary, for receiving the radiation from the first objective lens group and reflecting such radiation 90 degrees;
   (d) a field-flattening lens group which forms an image at an internal image plane;
   (e) an eyepiece lens group for receiving and recollimating the radiation from said internal image;
   (f) a second turn mirror for reflecting said radiation; and
   (g) a main objective lens group for refocusing said radiation at an output focal plane, said main objective lens group including a third turn mirror which is stationary.

9. A lens arrangement as in claim 8, wherein said input window comprises a zero-power silicon dome, said first objective lens group compensating for any aberrations in said silicon dome and being achromatized for the spectral range of about 3.4–5 microns.

10. A lens arrangement as in claim 8, wherein said elements (a)–(d) form a Keplerian telescope.

11. A lens arrangement as in claim 8, wherein said second turn mirror is a stationary mirror for producing an image at said output focal plane.

12. A lens arrangement as in claim 11, wherein said last-mentioned image is substantially one-dimensional.

13. A lens arrangement as in claim 11, wherein said last-mentioned image is substantially two-dimensional.

14. A lens arrangement as in claim 8, wherein said second turn mirror is a scan mirror for scanning an output image across a point in said output focal plane.

15. A lens arrangement as in claim 14, wherein said arrangement is substantially telecentric for infrared radiation.

16. A lens arrangement as in claim 1, wherein said optical elements include both refracting elements and reflecting elements, and said three reflections occur outside of said refracting elements.

17. A lens arrangement as in claim 1, wherein said optical elements include both refracting elements and reflecting elements, and said three reflections occur outside of said refracting elements.

18. A lens arrangement for receiving input radiation and processing such radiation, said arrangement comprising, in sequence:
   (a) an input window for receiving such radiation;
   (b) a first objective lens group;
   (c) a first turn mirror which is stationary, for receiving the radiation from the first objective lens group and reflecting such radiation 90 degrees;
   (d) a field-flattening lens group which forms an image at an internal image plane;
   (e) an eyepiece lens group for receiving and recollimating the radiation from said internal image;
   (f) a second turn mirror for reflecting said radiation; and
   (g) a main objective lens group for refocusing said radiation at an output focal plane, said main objective lens group including a third turn mirror which is stationary;
   comprising a plurality of elements configured and dimensioned as follows:

| Element | Power | Material | Outer radius, mm | Inner radius, mm | Thickness, mm | Type |
|---|---|---|---|---|---|---|
| 1 | O | Si | 114.300 | 107.950 | 6.35 | Dome |
| A1-2 | | | | | 29.00 | Air gap |
| 2 | P | Si | 89.024 | 182.842 | 7.9 | Spherical |
| A2-3 | | | | | 7.9 | Air gap |
| 3 | N | Ge | −358.712 | +3820.792 | 3.388 | Spherical |
| A3-4 | | | | | 4.143 | Air gap |
| 4 | P | Si | −261.808 | −165.749 | 4.353 | Spherical |
| A4-4a | | | | | 40 | Air gap |
| 4a | O | Pyrex | | | | Stationary Turn Mirror |
| A4a-5 | | | | | 26.706 | Air gap |
| 5 | N | Si | −468.512 | +1296.288 | 1.145 | Spherical |
| A5-6 | | | | | 0.0458 | Air gap |
| 6 | N | Ge | 13.215 | 12.905 | 1.182 | Spherical |
| A6-I | | | | | 3.476 | Air gap |
| I | | | | | | Image |
| AI-7 | | | | | 3.200 | Air gap |
| 7 | N | Ge | 104.854 | 83.979 | 3.903 | Spherical |

| Element | Power | Material | Outer radius, mm | Inner radius, mm | Thickness, mm | Type |
|---|---|---|---|---|---|---|
| A7-8 | | | | | 1.428 | Air gap |
| 8 | P | Si | −15.807 | −14.979 | 3.136 | Spherical |
| A8-9 | | | | | 6.100 | Air gap |
| 9 | P | Si | −37.319 | −21.473 | 3.187 | Spherical |
| A9-10 | | | | | 12.5 | Air gap |
| 10 | O | | | | | Turn mirror (Stationary/Scan) |
| A10/11 | | | | | 12.5 | Air gap |
| 11 | P | Si | 68.614 | 83.507 | 3.040 | Spherical |
| A11-12 | | | | | 21.800 | Air gap |
| 12 | O | | | | | Turn Mirror |
| A12-13 | | | | | 15.062 | Air gap |
| 13 | N | Si | 19.490* | 18.863** | 6.451 | **Spherical curve |
| A13-14 | | | | | 19.000 | Air gap |
| 14 | | | | | | Image |

*Aspheric Surface of Element 13:

| | | | |
|---|---|---|---|
| CC | $-1.44 \times 10^{-1}$ | AF | $-5.033 \times 10^{-11}$ |
| AD | $-2.78 \times 10^{-6}$ | AG | $8.101 \times 10^{-14}$ |
| AE | $1.335 \times 10^{-8}$ | | | wherein:
said input window comprises said element 1;
said first objective lens group comprises said elements 2-4;
said first turn mirror comprises said element 4a;
said field-flattening lens group comprises said elements 5-6;
said eyepiece lens group comprises said elements 7-9;
said second turn mirror comprises said element 10/10a; and
said main objective lens group comprises said elements 11-13.

* * * * *